United States Patent
Guignon et al.

(10) Patent No.: US 9,843,608 B2
(45) Date of Patent: Dec. 12, 2017

(54) METHOD OF SYNCHRONOUS IMAGE SHARING

(71) Applicant: Orange, Paris (FR)

(72) Inventors: Richard Guignon, Amanlis (FR);
Henry Thomas, Rennes (FR);
Delphine Guegan, Betton (FR)

(73) Assignee: ORANGE, Paris (FR)

( * ) Notice: Subject to any disclaimer, the term of this patent is extended or adjusted under 35 U.S.C. 154(b) by 341 days.

(21) Appl. No.: 14/573,924

(22) Filed: Dec. 17, 2014

(65) Prior Publication Data

US 2015/0172336 A1   Jun. 18, 2015

(30) Foreign Application Priority Data

Dec. 17, 2013   (FR) ...................................... 13 62822

(51) Int. Cl.
*G06F 15/16*   (2006.01)
*H04L 29/06*   (2006.01)
(Continued)

(52) U.S. Cl.
CPC ........... *H04L 65/403* (2013.01); *H04W 4/206* (2013.01); *H04W 12/02* (2013.01); *H04L 67/1095* (2013.01)

(58) Field of Classification Search
CPC .......................... G06F 3/0488; H04N 1/00209
See application file for complete search history.

(56) References Cited

U.S. PATENT DOCUMENTS

2003/0058275 A1   3/2003   Pilu et al.
2005/0066165 A1   3/2005   Peled et al.
(Continued)

FOREIGN PATENT DOCUMENTS

| EP | 1327201 A1 | 7/2003 |
|---|---|---|
| EP | 2360890 A1 | 8/2011 |
| WO | 0203733 A1 | 5/2002 |

OTHER PUBLICATIONS

French Search Report and Written Opinion dated Oct. 8, 2014 for corresponding French Application No. 1362822, filed Dec. 17, 2013.

(Continued)

*Primary Examiner* — Shean Tokuta
(74) *Attorney, Agent, or Firm* — David D. Brush; Westman, Champlin & Koehler, P.A.

(57) ABSTRACT

A method is provided for synchronous sharing of a document between a first and a second terminal. The method includes: transmission of a message to the second terminal comprising the coordinates of at least one contact point defined on the basis of the document to be shared; upon the opening of a viewing time window defined by the intersection of a first and of a second time window defined respectively for the first and the second terminal and each being bounded by the receipt, originating from the terminal, of a sharing agreement message triggered by an action on the at least one contact point and the receipt of an abandonment message triggered by the stopping of the action on the at least one contact point, of transmission of the document and of a command to display the document to the second terminal; and transmission of a command to delete the document upon the closing of the viewing time window.

8 Claims, 6 Drawing Sheets

(51) Int. Cl.
*H04W 4/20* (2009.01)
*H04W 12/02* (2009.01)
*H04L 29/08* (2006.01)

(56) References Cited

U.S. PATENT DOCUMENTS

| | | | |
|---|---|---|---|
| 2012/0089731 A1* | 4/2012 | Bin | G08C 17/02 709/224 |
| 2012/0180136 A1* | 7/2012 | Song | G06F 17/30557 726/26 |
| 2013/0191927 A1* | 7/2013 | Miura | G06Q 10/101 726/26 |
| 2014/0030980 A1* | 1/2014 | D'Ambrosio | H04W 76/02 455/41.3 |
| 2014/0101419 A1* | 4/2014 | Giddi | G06F 11/0742 713/1 |
| 2014/0331188 A1* | 11/2014 | Sandstrom | G06F 3/04883 715/863 |

OTHER PUBLICATIONS

English translation of the Written Opinion of the French Searching Authority dated Oct. 8, 2014 for corresponding French Application No. 1362822, filed Dec. 17, 2013.

* cited by examiner

METHOD OF SYNCHRONOUS IMAGE SHARING

FIELD OF THE DISCLOSURE

The field of the present invention is that of the sharing of documents between terminals and relates particularly to a method of synchronous image sharing.

BACKGROUND OF THE DISCLOSURE

The proliferation of communication means and in particular the massive adoption by the general public of connected terminals of smartphone type is today making it easier to share and publish diverse contents on the Internet. In particular, photo sharing holds a predominant place in the digital activity of Internet users. Alas, once published, even within a restricted friend circle, it becomes very difficult to control the broadcasting of these images.

Today, a great many Internet users are worried that other people can use their photos or videos, and are feeling the need to better control their broadcasting on the Internet.

In order to broadcast a photo within a restricted circle of counterparts, it is possible to use messaging systems such as for example MMS (Multimedia Messaging System), electronic mail or else various instant messaging facilities. Despite everything, it is not possible to prohibit the rebroadcasting of contents thus shared, or to cancel their broadcasting after dispatch.

Certain services such as the Snapchat® application from the company Snapchat, Inc. or else the "poke" service from the company Facebook® propose to limit the risk of rebroadcasting of shared photos by deleting media a few seconds after they have been consulted by the recipient. However, it is fairly easy for a recipient to carry out a screen capture during the time interval for which the photo is displayed. Moreover, the time allowed for consulting the image can sometimes be too brief to assess the content thereof and it is impossible for the sender to control the moment and the duration of consultation by the recipient.

There therefore exists a need for users to be able to more finely control the sharing of content to a counterpart while having the assurance that the latter will not be rebroadcast to a third party.

SUMMARY

A first aspect of the present disclosure relates to a method of synchronous sharing of a document between a first and a second terminal comprising steps of transmitting a message to the second terminal comprising the coordinates of at least one contact point defined on the basis of the document to be shared; upon the opening of a viewing time window defined by the intersection of a first and of a second time window defined respectively for the first and the second terminal and each being bounded by the receipt, originating from the terminal, of a sharing agreement message triggered by an action on the at least one contact point and the receipt of an abandonment message triggered by the stopping of the action on the at least one contact point, of transmitting the document and a command to display the document to the second terminal; and of transmitting a command to delete the document upon the closing of the viewing time window.

The method thus proposes to transmit to the second terminal a notification of sharing of an image for example. This notification comprises in particular the coordinates corresponding to the location of at least one contact point on the image. The coordinates of the contact points can be calculated automatically on the basis of the image in such a way that they are always distributed in an identical manner for a given image. A sharing agreement signal is dispatched by the second terminal when an action is detected on the screen at the location of the at least one contact point, for example when the user rests his fingers thereon. The receipt of this message causes the opening of a first time window associated with the second terminal, and which can be reclosed for example when the action on the contact points is halted on the terminal. Likewise, a sharing agreement signal is dispatched by the first terminal when an action is detected on the screen, for example when the user rests his fingers thereon at the location of the at least one contact point. The receipt of this message causes the opening of a second time window associated with the first terminal, and which can be reclosed for example when the action on the contact points is halted on the terminal. A new, so-called viewing, time window can then be defined by the intersection of the first and second time window. Upon the opening of the viewing window, the image is transmitted to the second terminal accompanied by a command to display the image on the second terminal.

Thus, the image is displayed on the second terminal only during the period for which the user of the first terminal and the user of the second terminal simultaneously perform a predefined action at the location of the at least one contact point. The user at the origin of the sharing can thus control the instant at which the recipient can consult the image as well as the duration of consultation.

When an abandonment signal is received from a terminal, for example subsequent to the stopping of the action on the contact points on one of the terminals, the method proposes to transmit a command to delete the shared image to the terminals.

The method thus affords a guarantee that it will not be possible for the shared document to be rebroadcast subsequently. Moreover, by requiring that the action on the contact points be maintained during viewing, the method makes it trickier to carry out a possible screen capture.

According to a particular embodiment, the method is such that it comprises, upon the prior receipt of a command to share the document comprising the document to be shared, a step of storing the document.

The document can thus be stored temporarily upon receipt of a sharing request and until the opening of the viewing window. In the case of an implementation of the method on a server for example, the method thus allows the image to be at the disposal of the server immediately upon receipt of the sharing request so as to calculate the coordinates of the contact points. The coordinates of the contact points can thus be transmitted to the second terminal independently of the document itself, the latter being transmitted only upon the opening of the viewing window. Thus the image is not available on the second terminal outside of the viewing time window. This latter point affords security as regards a rather unscrupulous practice which would consist in analyzing the memory of the terminal so as to extract the image therefrom outside of the time window during which the viewing of the image is authorized.

According to a particular embodiment, the method is such that a command to delete the document is sent to the second terminal when no message originating from A is received during a predetermined time interval.

The method thus makes it possible to guarantee that in case of loss of the network connection with the first terminal, a deletion command will be dispatched to the second terminal so as to halt the restitution of the shared image.

According to a second aspect, the disclosure relates to a method of control of synchronous sharing of a document on a first touchscreen terminal to a second terminal characterized in that it comprises steps of transmitting a command to share the document; upon receipt of a sharing agreement message originating from the second terminal, of transmitting a sharing agreement message triggering the opening of a viewing time window when an action on at least one contact point is detected on the screen of the first terminal, and of closing the viewing time window and of transmitting at least one command to abandon the sharing of the document when the stopping of the action on the at least one contact point is detected on the screen of the first terminal.

The method of control of sharing thus proposes to dispatch a sharing command to an entity able to implement the method of synchronous sharing, such as for example a server accessible via a telecommunications network. The sharing command can comprise for example an image that the user of the first terminal wishes to share with a user of a second terminal. A sharing agreement can then be received, for example subsequent to a predefined action of the user of the second terminal at the location of contact points, thus signaling the opening of a time window associated with the second terminal. Subsequent to the receipt of the sharing agreement, the first terminal can invite the user to perform an action on one or several contact points and send in his turn a sharing agreement signaling the opening of a time window associated with the first terminal. An entity implementing the method of synchronous sharing can then open a viewing time window authorizing the display of the document on the second terminal. When the action on the contact points ceases on one of the terminals, an abandonment command can be sent, thus signaling the closing of the time window associated with the first terminal and the closing of the viewing window, consequently ending the display of the document on the second terminal. The method according to an embodiment thus allows the user of the first terminal to have the guarantee that the document can only be viewed during the period during which he performs an action at the location of the contact points. Moreover, the method affords the user of the first terminal the possibility of declining to share a document even after the dispatch of a sharing command.

According to another particular embodiment, the method of control of sharing is such that the sharing agreement message is retransmitted periodically at predetermined intervals as long as the viewing time window is open.

The agreement message is thus repeated as long as the user of the first terminal maintains the action on the contact points. In this manner, the second terminal can detect a possible loss of network connection and halt the restitution of the shared document when no longer receiving the sharing agreement for a predetermined period.

According to another aspect, the disclosure relates to a device for synchronous document sharing between a first and a second terminal, such that it comprises modules for defining the coordinates of at least one contact point on the basis of the document; for transmitting a message comprising the coordinates of the at least one contact point; for determining a time window on the basis of messages received; for calculating an intersection between two time windows; for transmitting a document to be shared, a command to display the document, and a command to abandon the sharing of the document.

According to another aspect, the disclosure relates to a device for control of synchronous document sharing on a touchscreen terminal characterized in that it comprises modules for transmitting a document sharing command; for receiving a sharing agreement message; for detecting an action on at least one contact point on the screen, and for transmitting a sharing agreement and a command to abandon the sharing.

The disclosure also relates to a server comprising a device for synchronous document sharing.

The disclosure also relates to a terminal comprising a device for control of synchronous document sharing.

According to another embodiment, the disclosure relates to a terminal comprising a device for synchronous document sharing and a device for control of synchronous document sharing.

The disclosure also relates to a system for synchronous document sharing such that it comprises a server comprising a device for synchronous sharing, a first terminal comprising a device for control of synchronous sharing and a second terminal.

According to another aspect, the disclosure relates to a computer program comprising the instructions for the execution of the method of synchronous document sharing and/or of the method of control of synchronous document sharing, when the program is executed by a processor.

A last aspect of the disclosure pertains to a recording medium readable by a computer on which is recorded a computer program comprising instructions for the execution of the steps of the method of synchronous document sharing or the instructions for the execution of the steps of the method of control of synchronous document sharing.

LIST OF FIGURES

Other characteristics and advantages will become more clearly apparent on reading the following description of a particular embodiment, given by way of simple illustrative and nonlimiting example, and the appended drawings, among which.

DESCRIPTION OF A PARTICULAR EMBODIMENT

Figure 1:
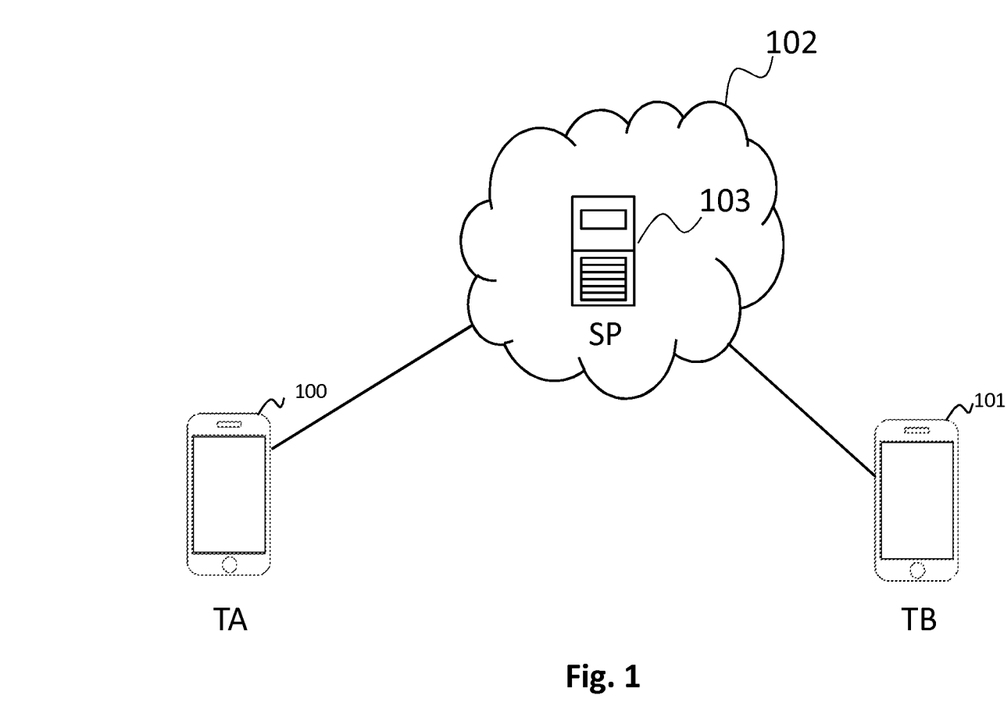
FIG. 1 illustrates an environment adapted for the implementation of the methods of synchronous sharing and control of sharing, according to a particular embodiment.

FIG. 1 illustrates an exemplary environment adapted for the implementation of a particular aspect of the disclosure. In this example, the environment comprises a first terminal TA (100) able to implement the method of control of synchronous sharing according to a particular embodiment.

The environment also comprises a second terminal TB (101) adapted for the restitution of an image shared by the user of the terminal TA. The terminals 100 and 101 are connected to a telecommunication network 102, for example by way of a wifi network or else a cellular network of 3G type. The telecommunication network 102 comprises a sharing server SP (103) adapted for the implementation of the method of synchronous sharing according to a particular embodiment of the disclosure. The terminals TA and TB can be touchscreen terminals, such as for example mobile terminals of smartphone type.

Figure 2:
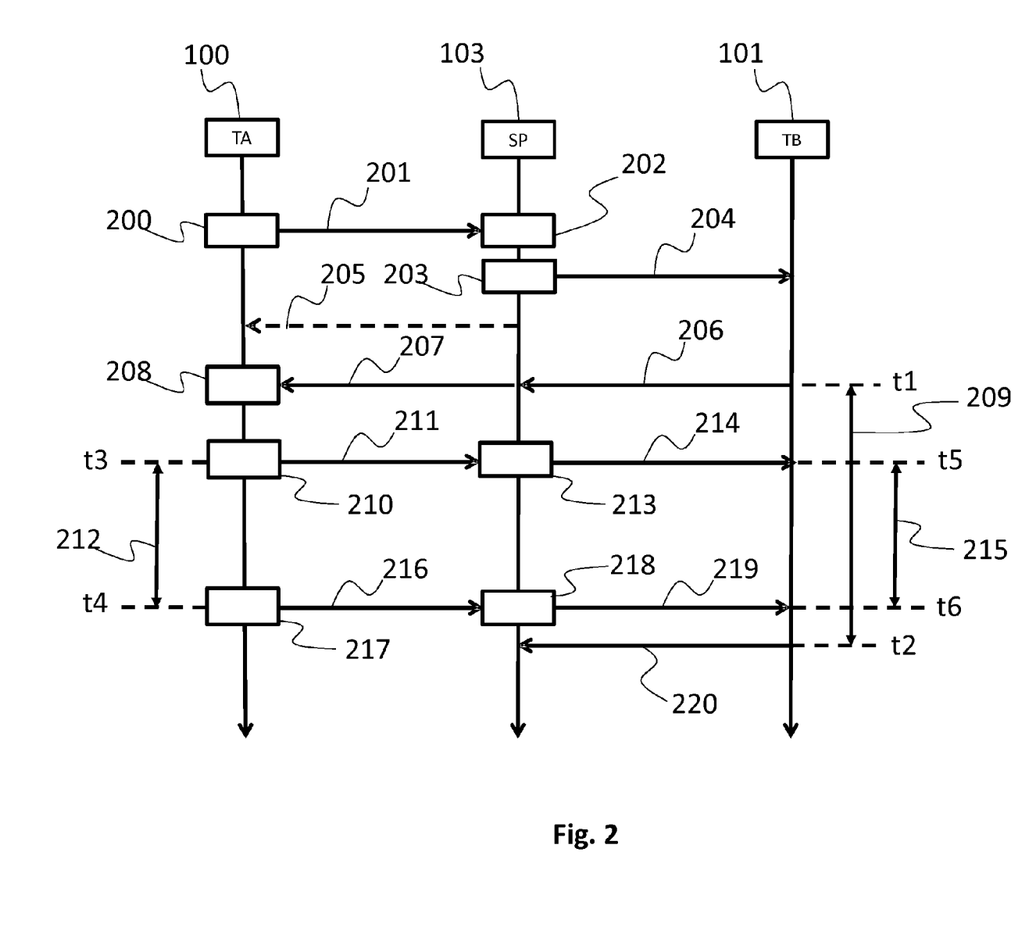
FIG. 2 illustrates in the form of a timechart the main steps of the methods of synchronous sharing and control of sharing according to a particular embodiment.

FIG. 2 illustrates the main steps of the methods of synchronous sharing and control of sharing as well as the messages able to be exchanged between the various entities of the environment, according to a particular embodiment.

According to a first step 200, the terminal TA (100) transmits to the server SP (103) a command to share a document, for example an image. The command can be transmitted by way of a message 201, for example by way of an http (HyperText Transfer Protocol) request. The request 201 can in particular comprise the document to be shared and an item of data making it possible to identify the recipient of the sharing, such as for example an electronic address, an IP (Internet Protocol) address or any other means of identification of the recipient. In this example, the terminal transmits an image that the user of the terminal TA wishes to share with the user of the terminal TB.

During a step 202 the server SP receives the sharing command comprising the image to be shared and stores the document, for example by storing it in a database or else in the form of a file recorded in a persistent memory.

In step 203, the server SP calculates contact points on the basis of the image in such a way that for a given image, the coordinates of the contact points always correspond to the same locations on the image. Accordingly, the server SP can calculate a characteristic digital signature of the image signal. For example, this signature can be calculated according to the method described in the document "EP 1327201 A1: System and method for hashing digital images" in such a way that two visually identical images produce the same digital signature. The number of contact points to be calculated can be predefined by on-server parametrization or be determined automatically for example as a function of characteristics of the image, such as for example as a function of its dimensions. The number and the coordinates of the contact points can also be determined randomly in a predetermined bracket of values for example. The server SP can thereafter transmit the coordinates of the contact points to the terminal TB (101) by way of a message, for example a message 204 of http type. According to a particular embodiment, the server SP can also transmit the coordinates of the contact points to the terminal TA, for example in a response 205 to the http request 201 or else by a dedicated message. According to another embodiment, the coordinates of the contact points can be calculated by the terminal TA during step 200 and transmitted to the server in the sharing command message 201.

At this juncture, the sharing command has been received by the terminal TB which can then notify its user and display for example pictograms at the locations indicated by the coordinates of the contact points. The terminal TB can then invite its user to perform an action on the contact points thus demarcated so as to view the image. This action can for example consist in maintaining contact with the screen of the terminal at the location of the contact points.

At the instant t1, the user of the terminal TB performs an action on the contact points, thus causing the sending of a sharing agreement message 206 destined for the server SP. Upon receipt of this message, the server SP can open a time window 209 associated with the terminal TB. Accordingly, the server can for example store, for example in a RAM (Random Access Memory) memory, the fact that the agreement message originating from the terminal TB has indeed been received. The server SP can thereafter propagate the sharing agreement message to the terminal TA, for example by means of an http message 207, so as to signal to the user of the terminal TA during a step 208, that the recipient of the sharing is waiting for his agreement to view the image.

At the instant t3, the user of the terminal TA can perform an action on the contact points and thus trigger the dispatching of an agreement message 211 to the server SP during a step 210. The receipt of this message by the server in step 213 can cause the opening of a time window 212 associated with the terminal TA.

According to a particular embodiment, the agreement message can be repeated at regular intervals by the terminal TA as long as the time window remains open. For example, the terminal TA can re-send the agreement message 211 every 5 seconds, in such a way that the server SP can detect a loss of connection. When the server SP receives a sharing agreement message, it can for example set a clock or "timer" to a predetermined duration. When the "timer" expires although no other sharing agreement message has been received, the server SP can dispatch a deletion command, for example the message 219, to the second terminal TB so as to halt the restitution of the document.

During step 213, the server can determine that the time windows associated with the terminal TA and with the terminal TB are both open and can trigger, at the instant t5, the opening of a viewing time window 215, during which the user of the terminal TB will have the possibility of viewing the shared image. According to an embodiment of the disclosure, this viewing time window can correspond to the intersection of the time windows associated with the terminal TA and with the terminal TB. Stated otherwise, the viewing window is open only when the windows associated with TA and TB are open simultaneously. Accordingly the server can transmit to the terminal TB a display command 214 comprising the shared image. The server can for example use a message of http type to transmit the display command and attach thereto the image stored in step 202.

Thus, the user of the terminal TB can view the image as long as the action on the contact points is maintained simultaneously on the terminals TA and TB.

At the instant t4, the user of the terminal TA can halt the action on the contact points so as to interrupt the sharing. The interruption of the action by the user of the terminal TA causes the sending of a message to abandon the sharing (216) in step 217.

The receipt of the abandonment message by the server during a step 218 causes the closing of the time window associated with the terminal TA. Accordingly, the server can erase from its memory the fact that the agreement message originating from TA has been received. The consequence of the closing of the time window 212 associated with TA is the closing of the viewing time window 215 at the instant t6 since it corresponds to the intersection of the time windows associated with TA and with TB. The server SP can then send a shared document deletion command (219) to the terminal TB, conveyed for example by a message of http type. The receipt of this command by the terminal TB can cause the stopping of the display of the image on the terminal TB and the erasure of the image from the memory of the terminal. According to a particular embodiment, the image can also be deleted from the server SP.

At the instant t2, the user of the terminal TB can cease the action on the contact points, thus causing the sending of an abandonment signal 220.

It should be noted that the instants t1, t2, t3 and t4 can of course be distributed differently in time. For example, the instant t2 can precede the instant t4 and it is then the abandonment message 220 which causes the closing of the viewing window 215 and the end of the sharing.

Figure 3:
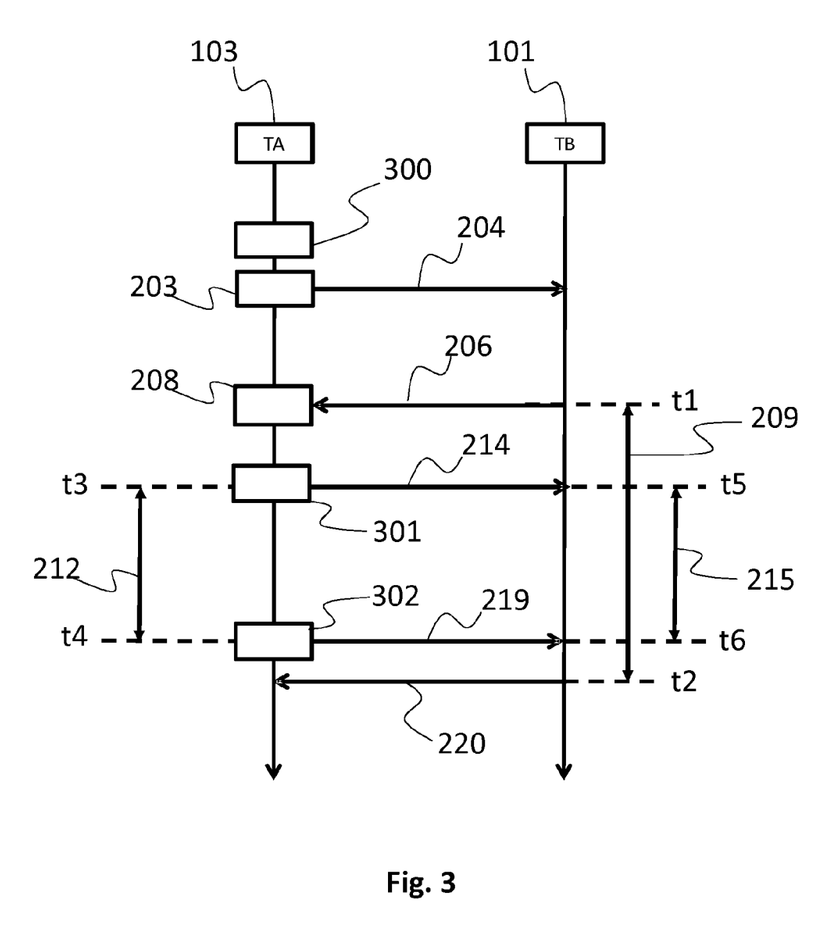
FIG. 3 illustrates in the form of a timechart the main steps of the methods of synchronous sharing and control of sharing according to another particular embodiment.

FIG. 3 illustrates the main steps of the method of synchronous sharing as well as the messages able to be exchanged between the various entities of the environment, according to another particular embodiment in which the server 103 described with reference to FIG. 2 is integrated into the terminal TA (100).

During a first step 300, the terminal TA generates a command to share a document, for example an image. This command can be triggered by an action of the user on his terminal, for example subsequent to the taking of a photograph with the aid of a camera integrated into the terminal. The command can consist of a procedure call on the terminal and can comprise the image to be shared as well as the coordinates of the recipient as parameter of the call. Subsequent to this procedure call, the terminal carries out step 203 described with reference to FIG. 2, during which contact points are calculated on the basis of the image selected for the sharing. Subsequent to the determination of the contact points, the terminal TA can transmit the coordinates of the contact points to the terminal TB (101) by way of a message, for example a message 204 of http type. The terminal TB can then present to its user an interface inviting him to perform an action on contact points demarcated on the screen.

At the instant t1, the user of the terminal TB performs an action on the contact points, thus causing the sending of a sharing agreement message 206 destined for the terminal TA. Upon receipt of this message, the terminal TA can open a first time window 209 associated with the terminal TB and can indicate to its user, upon the occasion of a step 208, that the recipient of the sharing is waiting for his agreement to view the image.

At the instant t3, the user of the terminal TA can perform an action on the contact points and thus trigger the opening of a second time window 212 associated with the terminal TA. The simultaneous opening of the time windows associated with TA and TB causes the opening of the viewing window 215 at the instant t5 and the dispatching, during step 301, of an agreement message 214 comprising the image to be shared to the terminal TB and a display command. The image can thus be viewed on the terminal TB for the duration for which the action on the contact points on the terminals TA and TB persists simultaneously. According to a particular embodiment, the agreement message can be repeated at regular intervals by the terminal TA as long as the time window remains open. For example, the terminal TA can re-send the agreement message 214 every 5 seconds, in such a way that the terminal TB can detect a loss of connection and halt the restitution of the image. The agreement message re-sent might not contain the image.

At the instant t4, the user of the terminal TA can halt the action on the contact points so as to interrupt the sharing. The interruption of the action by the user of the terminal TA causes the sending of a command to abandon the sharing that is manifested by the closing of the time window 212 and consequently of the viewing window 215. The closing of the viewing time window then causes the sending of a command to delete the document 219 in step 302, which, upon its receipt by the terminal TB, terminates the image display period at the instant t6. The user of the terminal TB can halt the action on the contact points at the instant t2, then causing the closing of the time window associated with TB and the dispatching of an abandonment message 220. It may also be noted that the sequencing of the instants t1, t2, t3, t4, t5 and t6 is given by way of example, the actions of the users on the contact points being able to be ordered differently.

Thus, the embodiments described with reference to FIGS. 2 and 3 allow the user of the terminal TA to precisely control the moment and the time of viewing by the user of the terminal TB.

Figure 4A:
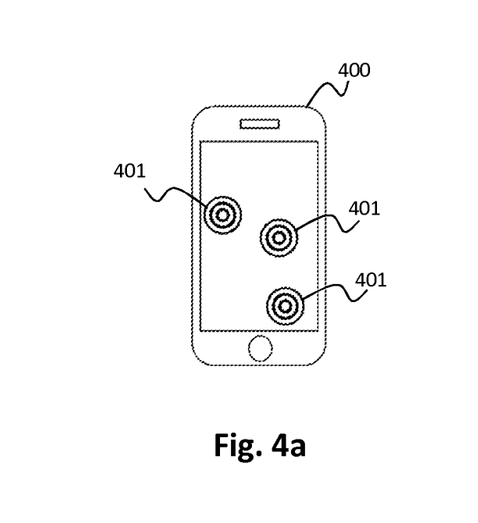
FIGS. 4a and 4b illustrate an action able to be performed by a user on the screen of a terminal at the location of contact points.
Figure 4B:
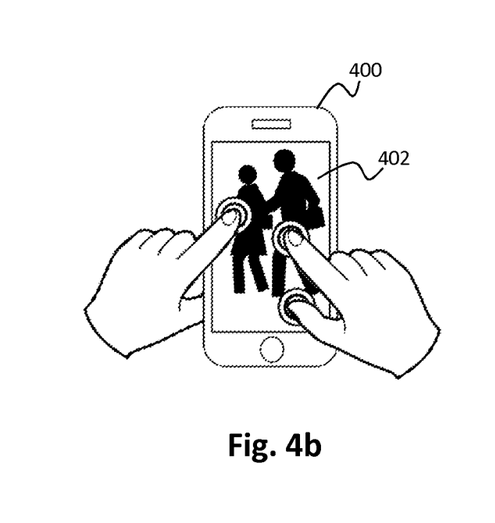

FIGS. 4a and 4b illustrate a possible mode of action on contact points. In particular, FIG. 4a illustrates a terminal 400 on which contact points 401 are demarcated. This figure can correspond to the display of the terminal TB subsequent to the receipt of the message 204 comprising the coordinates of the contact points, described with reference to FIGS. 2 and 3. FIG. 4b illustrates for its part the display of an image 402 on a terminal subsequent to an action on the contact points when a viewing time window is open. This figure can correspond to a display of the terminal TB when the viewing window 215, described with reference to FIGS. 2 and 3, is open.

Figure 5:
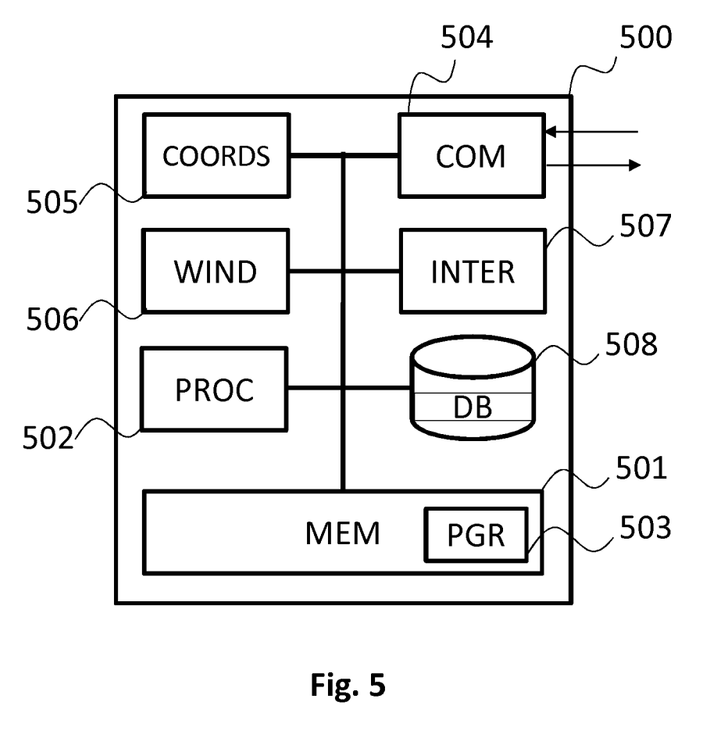
FIG. 5 illustrates the architecture of a device adapted for the implementation of the method of synchronous sharing according to a particular embodiment.

FIG. 5 illustrates a device 500 implementing the method of synchronous sharing, according to a particular embodiment of the disclosure. The device comprises a storage space 501, for example a memory MEM, a processing unit 502 equipped for example with a processor PROC. The processing unit can be driven by a program 503, for example a computer program PGR, implementing the method of synchronous sharing such as described with reference to FIGS. 2 and 3, and especially the steps of transmitting a message to the second terminal comprising the coordinates of at least one contact point defined on the basis of the document to be shared (203); upon the opening of a viewing time window defined by the intersection of a first and of a second time window defined respectively for the first and the second terminal and each being bounded by the receipt, originating from the terminal, of a sharing agreement message triggered by an action on the contact points and the receipt of an abandonment message triggered by the stopping of the action on the contact points, of transmitting the document and a command to display the document to the second terminal (213, 301); and of transmitting a command to delete the document upon the closing of the viewing time window (218, 302).

On initialization, the instructions of the computer program 503 are for example loaded into a RAM (Random Access Memory) memory before being executed by the processor of the processing unit 502. The processor of the processing unit 502 implements the steps of the method of synchronous sharing according to the instructions of the computer program 503. Accordingly, the device comprises, in addition to the memory 501, communication means 504 (COM) allowing the device to connect to the telecommunication network and to exchange data with other devices by way of the telecommunications network, and for example to transmit a message to the second terminal comprising the coordinates of at least one contact point, a document and a command to display the document or else a command to delete the document upon the closing of the viewing window. These communication means can for example be a network interface and can also serve to receive sharing command, sharing agreement, and sharing abandonment messages. The device also comprises means 505 for calculating coordinates of the contact points on the basis of a document, means 506 for determining a time window on the basis of messages received, means 507 for calculating an intersection between two time windows.

The device also comprises a persistent memory 508, for example a database DB.

According to a particular embodiment, the device can be integrated into an item of network equipment of server type or into a terminal of mobile telephone, tablet, digital photographic apparatus, personal computer type, or else any other item of equipment connected to a communication network.

Figure 6:
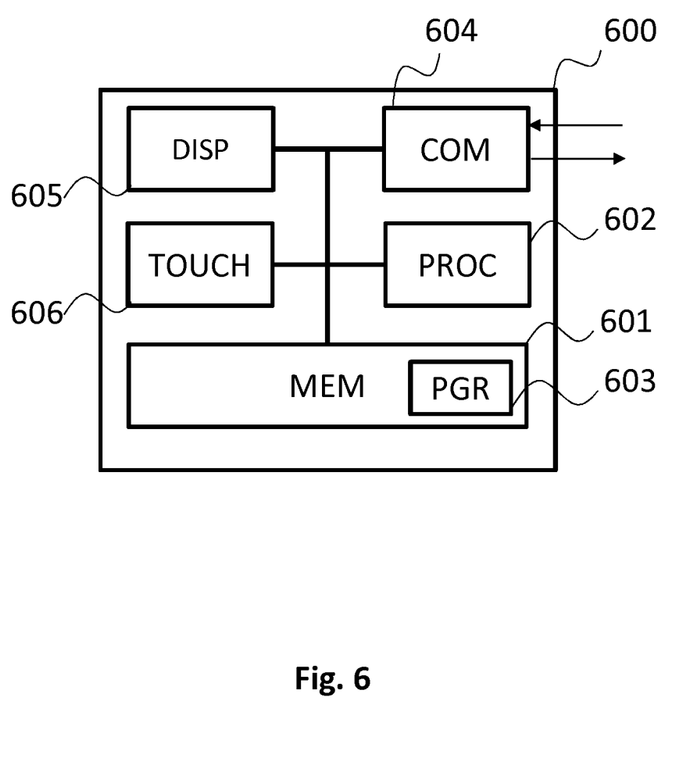
FIG. 6 illustrates the architecture of a device adapted for the implementation of the method of control of sharing according to a particular embodiment.

FIG. 6 illustrates a device 600 implementing the method of control of synchronous sharing, according to a particular embodiment of the disclosure. The device comprises a storage space 601, for example a memory MEM, a processing unit 602 equipped for example with a processor PROC. The processing unit can be driven by a program 603, for example a computer program PGR, implementing the method of control of synchronous sharing such as described with reference to FIG. 2, and especially the steps of transmitting a command to share the document (200, 300); upon receipt of a sharing agreement message originating from the second terminal, of transmitting a sharing agreement message (210, 301) triggering the opening of a viewing time window when an action on contact points is detected on the screen of the first terminal; and of transmitting at least one command to abandon the sharing of the document (217, 302) causing the closing of the viewing time window when the stopping of the action on the contact points is detected on the screen of the first terminal.

On initialization, the instructions of the computer program 603 are for example loaded into a RAM (Random Access Memory) memory before being executed by the processor of the processing unit 602. The processor of the processing unit 602 implements the steps of the method of synchronous sharing according to the instructions of the computer program 603. Accordingly, the device comprises, in addition to the memory 601, communication means 604 (COM) allowing the device to connect to a telecommunication network and to exchange data with other devices by way of the telecommunications network, and for example to transmit a command to share a document, a sharing agreement or sharing abandonment message. These communication means can for example be a network interface and can also serve to receive messages of agreement to sharing and deletion of a shared document. The device also comprises means for detecting coordinates of the contact points on the basis of a document 606, such as for example a touchscreen TOUCH and display means 605, such as for example a screen DISP.

According to a particular embodiment, the device can be integrated into a terminal of mobile telephone, tablet, digital photographic apparatus, personal computer type, or else any other item of equipment connected to a communication network.

According to another particular embodiment, a terminal can comprise both a device for control of synchronous sharing and a device for synchronous sharing such as are described hereinabove.

The invention claimed is:

1. A method of synchronous sharing of a document between a first and a second terminal, wherein the method comprises:

transmitting, from the first terminal, a message to the second terminal comprising coordinates of at least one contact point to be activated on a touchscreen of the second terminal, which are defined on the basis of the document to be shared, upon opening of a viewing time window defined by the intersection of a first and of a second time window defined respectively for the first and the second terminal, transmission of the document and command to display the document to the second terminal, wherein the first time window is defined for the first terminal and starts upon receipt of a sharing agreement from the second terminal and ceases on receipt of a sharing abandonment from the second terminal and the second time window is defined for the second terminal and starts upon receipt of a sharing agreement from the first terminal and ceases on receipt of a sharing abandonment from the first terminal, wherein the sharing agreement message is triggered by an action on the at least one contact point of the touchscreen of the respective terminal and the abandonment message is triggered by stopping of the action on the at least one contact point of the touchscreen of the respective terminal, and transmitting from the first terminal to the second terminal, a command to delete the document upon closing of the viewing time window.

2. The method according to claim 1, wherein the method comprises, upon a prior receipt of a command to share the document comprising the document to be shared, a step of storing the document.

3. The method according to claim 1, wherein a command to delete the document is sent to the second terminal when no message originating from the first terminal is received during a predetermined time interval.

4. The method according to claim 1, wherein the sharing agreement message is retransmitted periodically at predetermined intervals as long as the viewing time window is open.

5. A device for synchronous document sharing between a first and a second terminal, wherein the device comprises:

means for defining coordinates of at least one contact point to be activated on a touchscreen on the basis of the document, means for transmitting, from the first terminal, a message to the second terminal comprising coordinates of at least one contact point to be activated on a touchscreen of the second terminal, defined on the basis of the document to be shared, means for determining a time window on the basis of messages received, means for calculating an intersection between two time windows, means for transmitting the document and a command to display the document to the second terminal upon opening of a viewing time window defined by the intersection of a first and of a second time window defined respectively for the first and the second terminal, transmitting a command to delete the document upon closing of the viewing time window, wherein the first time window is defined for the first terminal and starts upon receipt of a sharing agreement from the second terminal and ceases on receipt of a sharing abandonment from the second terminal and the second time window is defined for the second terminal and starts upon receipt of a sharing agreement from the first terminal and ceases on receipt of a sharing abandonment from the first terminal, wherein the sharing agreement message is triggered by an action on the at least one contact point of the touchscreen of the respective terminal and the abandonment message is triggered by stopping of the action on the at least one contact point of the touchscreen of the respective terminal.

6. The device according to claim 5, wherein the device is a server, which implements the synchronous document sharing.

7. The device according to claim 5, wherein the device is a terminal, which implements the synchronous document sharing.

8. A non-transitory computer-readable medium on which is recorded a computer program comprising instructions for execution of a method of synchronous document sharing between a first and a second terminal, when the instructions are executed by a processor, wherein the method comprises:
  transmitting, from the first terminal, a message to the second terminal comprising coordinates of at least one contact point to be activated on a touchscreen of the second terminal, which are defined on the basis of the document to be shared,
  upon opening of a viewing time window defined by the intersection of a first and of a second time window defined respectively for the first and the second terminal, transmission of the document and eta command to display the document to the second terminal, wherein the first time window is defined for the first terminal and starts upon receipt of a sharing agreement from the second terminal and ceases on receipt of a sharing abandonment from the second terminal and the second time window is defined for the second terminal and starts upon receipt of a sharing agreement from the first terminal and ceases on receipt of a sharing abandonment from the first terminal, wherein the sharing agreement message is triggered by an action on the at least one contact point of the touchscreen of the respective terminal and the abandonment message is triggered by stopping of the action on the at least one contact point of the touchscreen of the respective terminal, and transmitting, from the first terminal to the second terminal, a command to delete the document upon closing of the viewing time window.

\* \* \* \* \*

UNITED STATES PATENT AND TRADEMARK OFFICE
CERTIFICATE OF CORRECTION

PATENT NO.        : 9,843,608 B2
APPLICATION NO.   : 14/573924
DATED             : December 12, 2017
INVENTOR(S)       : Richard Guignon, Henry Thomas and Delphine Guegan Page 1 of 1

It is certified that error appears in the above-identified patent and that said Letters Patent is hereby corrected as shown below:

In the Claims

Column 12:
Claim 8, Line 2 delete "eta" and insert --a--

Signed and Sealed this
Fifth Day of March, 2019

Andrei Iancu
*Director of the United States Patent and Trademark Office*